Figure 1:
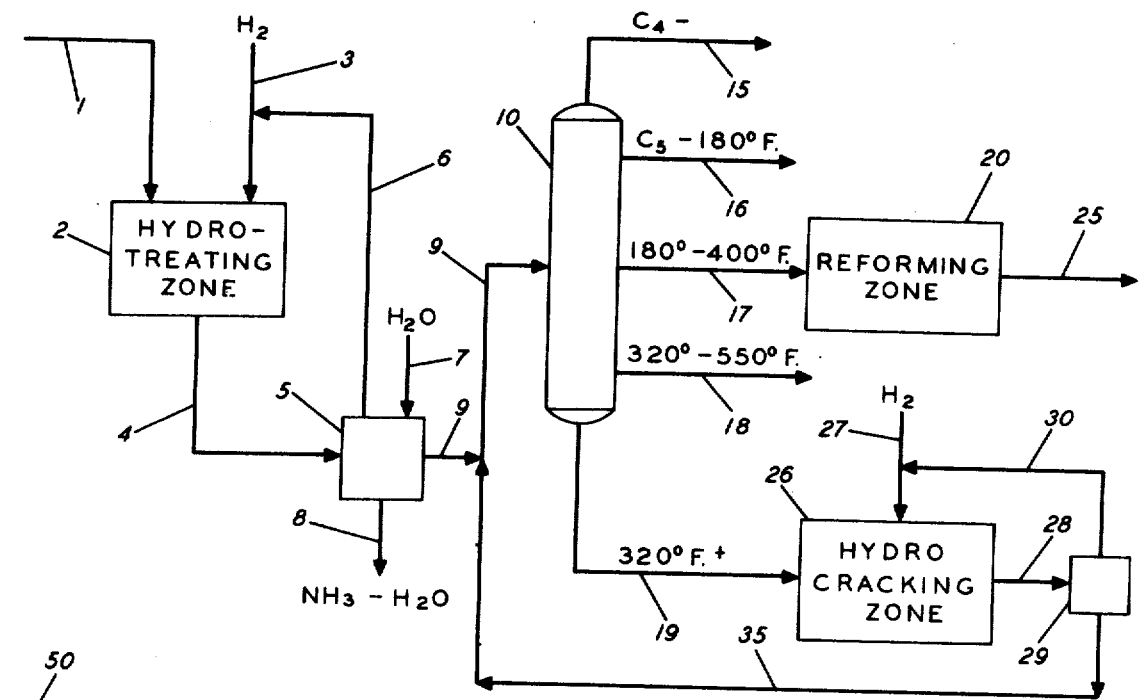

United States Patent
Jaffe et al.

[15] 3,669,873
[45] June 13, 1972

[54] HYDROFINING-HYDROCRACKING PROCESS

[72] Inventors: Joseph Jaffe, Berkeley; James R. Kittrell, Palos Verdes Estates, both of Calif.

[73] Assignee: Chevron Research Company, San Francisco, Calif.

[22] Filed: March 31, 1970

[21] Appl. No.: 24,317

Related U.S. Application Data

[63] Continuation-in-part of Ser. No. 760,626, Sept. 18, 1968, abandoned.

[52] U.S. Cl. ................................208/59, 208/111, 208/254, 252/455 Z
[51] Int. Cl. ................C10g 13/06, C10g 23/02, C01b 33/28
[58] Field of Search ..................................208/59, 111, 254

[56] References Cited

UNITED STATES PATENTS

| | | | |
|---|---|---|---|
| 3,267,022 | 8/1966 | Hansford | 208/111 |
| 3,140,253 | 10/1965 | Plank et al. | 208/120 |
| 3,459,680 | 8/1969 | Plank et al. | 252/455 |
| 3,393,148 | 7/1968 | Bertolacini et al. | 208/264 |
| 3,562,144 | 2/1971 | Child et al. | 208/59 |

*Primary Examiner*—Delbert E. Gantz
*Assistant Examiner*—G. E. Schmitkons
*Attorney*—A. L. Snow, Frank E. Johnston, George F. Magdeburger, Charles J. Tonkin and Roy H. Davies

[57] ABSTRACT

A hydrofining-hydrocracking process which comprises contacting a hydrocarbon feed containing more than 50 parts per million of organic nitrogen and substantial amounts of materials boiling above 200° F., said feed being selected from the group consisting of petroleum distillates, solvent-deasphalted petroleum residua, shale oils and coal tar distillates, in a reaction zone with hydrogen and a catalyst, a t hydrofining-hydrocracking conditions including a temperature in the range 400° to 950° F., a pressure in the range 800 to 3,500 psig, a liquid hourly space velocity in the range 0.1 to 5.0, and a total hydrogen supply rate of 200 to 20,000 SCF of hydrogen per barrel of feedstock, removing ammonia from the effluent from said reaction zone, and recovering hydrofined and hydrocracked products from said reaction zone, said catalyst comprising:

A. A gel matrix comprising:
  a. at least 15 weight percent silica,
  b. alumina, in an amount providing an alumina-to-silica weight ratio of 15/85 to 80/20,
  c. Nickel or cobalt, or the combination thereof, in the form of metal, oxide, sulfide or any combination thereof, in an amount of 1 to 10 weight percent, based on said matrix, calculated as metal,
  d. Molybdenum or tungsten, or the combination thereof, in the form of metal, oxide, sulfide or any combination thereof, in an amount of 5 to 25 weight percent, based on said matrix, calculated as metal;
B. A crystalline zeolitic molecular sieve:
  a. containing less than 5 weight percent sodium,
  b. containing ions selected from Mn, rare earths of atomic numbers 58 to 71, and alkaline earths Mg, Ca, Sr and Ba,
  c. being substantially free of any catalytic loading metals,
  d. being in particulate form and being dispersed throughout said matrix by cogelation of said matrix around said sieve;
  said catalyst composite being further characterized by an average pore diameter below 100 Angstroms and a surface area above 200 square meters per gram.

3 Claims, 2 Drawing Figures

INVENTORS
JOSEPH JAFFE
JAMES R. KITTRELL
BY Roy H. Davies
ATTORNEY

HYDROFINING-HYDROCRACKING PROCESS

RELATED APPLICATION

This application is a continuation-in-part of copending application Ser. No. 760,626, filed Sept. 18, 1968, now abandoned.

INTRODUCTION

This invention relates to catalytic hydrocracking of petroleum distillates and solvent-deasphalted residua to produce high-value fuel products, including jet fuels and gasoline.

PRIOR ART

It is known that a catalyst may comprise a crystalline zeolitic molecular sieve component associated with other catalyst components. It is also known that at least some of said other catalyst components may be in the form of a matrix in which the molecular sieve component is dispersed. It is also known that such catalysts may be used for such reactions as catalytic cracking, hydrocracking, hydrodesulfurization. Representative prior art patents disclosing one or more of the foregoing matters include:

U.S. Pat. No. 3,140,251
U.S. Pat. No. 3,140,253
British Pat. No. 1,056,301
French Pat. No. 1,503,063
French Pat. No. 1,506,793

There has been a continuing search for further improvements in such catalysts, particularly for hydrocracking and hydrofining uses. It is known that the results of catalyst modifications often are largely unpredictable, and the increased number of possible modifications in catalysts containing an additional molecular sieve component does not diminish the unpredictability. A significantly improved result in a test with a modified catalyst containing a molecular sieve component and other catalyst components seldom would have been predictable before the test, particularly in hydrocracking and hydrofining applications of such catalysts, and is a much-desired goal.

OBJECTS

In view of the foregoing, objects of the present invention include providing a combination hydrofining-hydrocracking process using an improved catalyst comprising a crystalline zeolitic molecular sieve component associated with other catalyst components that has, compared with similar prior art catalysts:

1. improved hydrocracking activity; and
2. improved hydrodenitrification activity, said process being capable of producing high yields of excellent-quality jet fuel and other valuable fuel products from a feedstock containing more than 50 parts per million of organic nitrogen, without the necessity for a prior hydrofining step.

The present invention will best be understood, and further objects and advantages thereof will be apparent, from the following description when read in connection with the accompanying drawing.

DRAWING

In the drawing,

FIG. 1 is a diagrammatic illustration of apparatus and flow paths suitable for carrying out the process of several of the embodiments of the present invention, wherein the process of the present invention is operated on a once-through basis to concurrently hydrocrack and hydrodenitrify a hydrocarbon feedstock to produce more valuable products, some of which may be further upgraded by catalytic reforming or catalytic hydrocracking, if desired.

Figure 2:
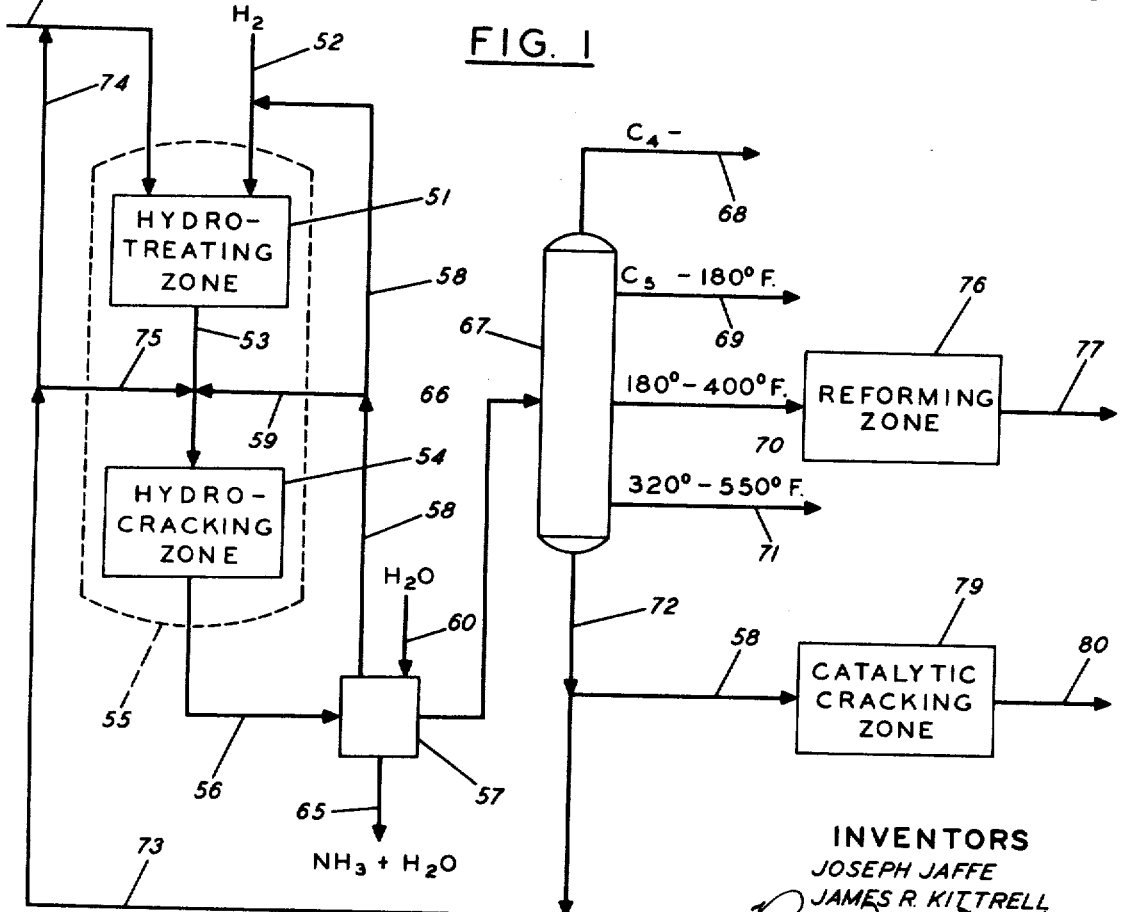

FIG. 2 is a diagrammatic illustration of apparatus and flow paths suitable for carrying out the process of additional embodiments of the present invention, wherein the catalyst of the present invention is used to concurrently hydrofine and hydrocrack a hydrocarbon feedstock, wherein the hydrofining-hydrocracking zone may be operated on a recycle basis, and wherein certain portions of the effluent from the hydrofining-hydrocracking zone may be catalytically reformed or catalytically cracked, as desired.

STATEMENT OF INVENTION

In accordance with the present invention, it has been found that the foregoing objects are achieved by a process wherein a hydrocarbon feedstock containing more than 50 parts per million organic nitrogen is concurrently hydrofined and hydrocracked by being contacted at particular hydrofining-hydrocracking conditions with hydrogen and a cogelled catalyst containing a unique combination of catalytic components in particular amounts, including silica, alumina, a Group VI component, a Group VIII component, and a crystalline zeolitic molecular sieve component that contains less than 5 weight percent sodium, calculated as metal, and that contains ions selected from Mn, rare earths of atomic numbers 58–71, and alkaline earths Mg, Ca, Sr and Ba.

More particularly, in accordance with the present invention there is used in said process a cogelled catalyst comprising:

A. A gel matrix comprising:
  a. at least 15 weight percent, preferably at least 40 weight percent, silica,
  b. alumina, in an amount providing an alumina-to-silica weight ratio of 15/85 to 80/20, preferably 40/60 to 60/40,
  c. nickel or cobalt, or the combination thereof, in the form of metal, oxide, sulfide or any combination thereof, in an amount of 1 to 10 weight percent, preferably 5 to 9 weight percent, of said matrix, calculated as metal,
  d. molybdenum or tungsten, or the combination thereof, in the form of metal, oxide, sulfide or any combination thereof, in an amount of 5 to 25 weight percent, preferably 10 to 20 weight percent, of said matrix, calculated as metal;
B. A crystalline zeolitic molecular sieve containing less than 5 weight percent sodium and containing ions selected from Mn, rate earths of atomic numbers 58–71, and alkaline earths Mg, Ca, Sr and Ba, said sieve further being in particulate form and being dispersed through said matrix;

said catalyst composite being further characterized by an average pore diameter below 100 angstroms and a surface area above 200 square meters per gram.

Preferably said gel matrix comprises nickel and tungsten, in the form of the metals, oxides, sulfides or any combination thereof. Said molecular sieve may be present in an amount of 1 to 50 weight percent of said composite.

Still further in accordance with the present invention, the catalyst used in said process may be a cogelled catalyst consisting essentially of:

A. A porous xerogel comprising:
  a. at least 15 weight percent, preferably at least 40 weight percent, silica,
  b. alumina, in an amount providing an alumina-to-silica weight ratio of 15/85 to 80/20 preferably 40/60 to 60/40,
  c. nickel, in the form of metal, oxide, sulfide or any combination thereof, in an amount of 1 to 10 weight percent, preferably 5 to 9 weight percent, of said xerogel, calculated as metal,
  d. tungsten, in the form of metal, oxide, sulfide or any combination thereof, in an amount of 5 to 25 weight percent, preferably 10 to 20 weight percent, of said xerogel, calculated as metal;
B. A crystalline zeolitic molecular sieve, in an amount of 1 to 50 weight percent of said catalyst, said sieve containing less than 5 weight percent sodium and containing ions selected from Mn, rate earths of atomic numbers 58–71, and alkaline earths Mg, Ca, Sr and Ba, said sieve further being in the form of particles, said particles being dispersed through said xerogel;

said catalyst having an average pore diameter below 100 Angstroms and a surface area above 200 square meters per gram.

The gel portion of the catalyst additionally may comprise titanium, zirconium, thorium, hafnium, or any combination thereof, in an amount of 1 to 10 weight percent, preferably 5 to 9 weight percent, of said gel portion, calculated as metal.

The crystalline zeolitic molecular sieve component of the catalyst may be in the form of an ultra-stable crystalline zeolitic molecular sieve, that is, one having a sodium content below 3 weight percent, calculated as $Na_2O$, a unit cell size below about 24.65 Angstroms, and a silica/alumina ratio above about 2.15.

Still further in accordance with the present invention there is provided a hydrofining-hydrocracking process which comprises contacting a hydrocarbon feed containing more than 50, and preferably more than 100, parts per million organic nitrogen, and containing substantial amounts of materials boiling above 200° F., said feed being selected from the group consisting of petroleum distillates, solvent-deasphalted petroleum residua, shale oils and coal tar distillates, in a reaction zone with hydrogen and the catalyst described above, at hydrofining-hydrocracking conditions including a temperature in the range 400° to 950° F., a pressure in the range 800 to 3,500 psig, a liquid hourly space velocity in the range 0.1 to 5.0 and a total hydrogen supply rate of 200 to 20,000 SCF of hydrogen per barrel of feedstock, removing ammonia from the effluent from said reaction zone, and recovering hydrofine and hydrocracked products from said reaction zone. The hydrocarbon feed may contain the indicated substantial amount of organic nitrogen because the catalyst used in the process of the present invention is extremely tolerant of organic nitrogen as well as of ammonia, and because the catalyst is an efficient hydrodenitrification catalyst. The catalyst will accomplish hydrodenitrification and hydrocracking concurrently and efficiently. The catalyst may be used as a hydrodenitrification catalyst in a zone preceding a hydrocracking zone containing a similar or different hydrocracking catalyst. A superior jet fuel product may be produced when the catalyst is used for hydrocracking a suitable feedstock. A superior feedstock for a catalytic reformer also may be produced when the catalyst is used for hydrocracking. The hydrocracking zone effluent boiling above the gasoline boiling range, or boiling above the jet fuel boiling range when a jet fuel product is being recovered, may be catalytically cracked to produce additional valuable products.

The crystalline zeolitic molecular sieve component of the catalyst used in the process of the present invention contains less than 5 weight percent sodium, and contains ions selected from Mn, rare earths of atomic numbers 58–71, and alkaline earths Mg, Ca, Sr and Ba. Said ions are polyvalent, non-catalytic ions. Preferably said molecular sieve component contains no other ions except hydrogen ions or ammonium ions, or precursors of hydrogen ions or ammonium ions. In particular, it is preferable that said molecular sieve component be substantially free of any catalytic loading metal or metals, for example the conventional Group VI and Group VIII catalytic metals. By "substantially free of any catalytic loading metal or metals" is meant that the molecular sieve component contains less than 0.5 total weight percent of catalytic metal or metals, based on the sieve, and less than 0.1 weight percent platinum or palladium, based on the sieve. The amount of the desired polyvalent non-catalytic ions present in the molecular sieve component will be from 0.1 to 10 weight percent, based on the sieve.

It will be noted that the weight ratio of catalytic metal in the non-molecular sieve portion of the catalyst to catalytic metal in the molecular sieve portion of the catalyst is high, when said molecular sieve is substantially free of any catalytic loading metal or metals. Certain prior art catalysts achieve a low catalytic metal loading of the molecular sieve component only with a concurrent very low metal content of the non-molecular sieve portion of the catalyst, and it has been found that such catalysts are inferior to the catalyst used in the process of the present invention.

HYDROCARBON FEEDSTOCKS

The feedstocks supplied to the hydrofining-hydrocracking zone in the process of the present invention are selected from the group consisting of petroleum distillates, solvent-deasphalted petroleum residua, shale oils and coal tar distillates. The feedstocks contain more than 50 parts per million of organic nitrogen, and contain substantial amounts of materials boiling above 200° F., preferably substantial amounts of materials boiling in the range 350° to 950° F., and more preferably in the range 400° to 900° F. Suitable feedstocks include those heavy distillates normally defined as heavy straight-run gas oils and heavy cracked cycle oils, as well as conventional FCC feed and portions thereof. Cracked stocks may be obtained from thermal or catalytic cracking of various stocks, including those obtained from petroleum, gilsonite, shale and coal tar. Because of the superior hydrofining activity and stability of the catalyst used in the process of the present invention, the feedstocks need not be subjected to a prior hydrofining treatment before being used in the hydrofining-hydrocracking process of the present invention. Feedstocks may contain as high as several thousand parts per million organic nitrogen, although preferably the organic nitrogen content will be less than 1,000 parts per million organic nitrogen. A desirable range of organic nitrogen is from 50 to 3,000 ppm, preferably 100 to 2,000 ppm. Feedstocks also may contain several weight percent organic sulfur.

CATALYST USED IN THE PROCESS OF THE PRESENT INVENTION, COMPRISING A CRYSTALLINE ZEOLITIC MOLECULAR SIEVE COMPONENT, AND PREPARATION THEREOF

A. General

The crystalline zeolitic molecular sieve component of the hydrofining-hydrocracking catalyst used in the process of the present invention, prior to being loaded with the required polyvalent non-catalytic ions, may be of any type that is known in the art as a useful component of a conventional hydrocracking catalyst containing a crystalline zeolitic molecular sieve component. Especially suitable are faujasite, particularly 'Y' type and 'X' type faujasite, including ultra-stable forms thereof, and mordenite.

B. Method of Preparation

The molecular sieve component of the catalyst may be prepared by any conventional manner known in the art.

The required loading ions may be added to the molecular sieve component of the catalyst by any convenient method, for example impregnation, adsorption or ion exchange. The compound containing the desired ion, used to add the desired ion to the molecular sieve component, may be any convenient compound, for example a chloride or nitrate containing the desired ion. When the molecular sieve component of the catalyst is in the sodium form prior to being loaded with the desired ions, the loading conveniently may be accomplished concurrently with reduction of the sodium content of the molecular sieve-component to the required level, by ion exchange.

The molecular sieve component may be dispersed in a matrix of the other catalyst components by cogelation of said other components around said molecular sieve component in a conventional manner.

The molecular sieve component, containing the required polyvalent, non-catalytic ions, may be maintained substantially free of any catalytic loading metal or metals by dispersing the molecular sieve component in a slurry of the precursors of the other catalyst components at a pH of 5 or above.

The cogelled catalyst may be washed and dried in a conventional manner. Drying may be accomplished at a temperature in the range 100° to 500° F. for a reasonable time, for example 2 to 48 hours. Following drying, the catalyst may be activated by subjecting it to a heat treatment at 850° to 1,100° F. for 0.5 to 20 hours. Said heat treatment advantageously may be conducted in the presence of steam, which will tend to enhance the efficacy of the catalyst by enhancing the efficacy of the polyvalent cation-containing molecular sieve component thereof. Particularly when the catalyst comprises an ultra-stable crystalline zeolitic molecular sieve component, it may be subjected, following drying, to a high-temperature thermactivation, at 1,200° to 1,600° F. for 0.25 to 48 hours, in an oxygen-containing gas stream, which may be air, and which preferably is as dry as practicable.

The finished catalyst may be sulfided in a conventional manner prior to use, if desired. If not presulfided, the catalyst will tend to become sulfided during process operation from any sulfur content that may be present in the hydrocarbon feed.

OPERATING CONDITIONS

The hydrofining-hydrocracking zone in the process of the present invention is operated at a temperature in the range 400° to 950° F., preferably 500° to 850° F., a pressure in the range 800 to 3,500 psig, preferably 1,000 to 3,000 psig, a liquid hourly space velocity in the range 0.1 to 5.0, preferably 0.5 to 5.0, and more preferably 0.5 to 3.0. The total hydrogen supply rate (makeup and recycle hydrogen) to said zone is 200 to 20,000 SCF, preferably 2,000 to 20,000 SCF of hydrogen per barrel of hydrocarbon feedstock.

The operating conditions in the reforming zone and catalytic cracking zone employed in various embodiments of the present invention are conventional conditions known in the art.

PROCESS OPERATION WITH REFERENCE TO DRAWING

Referring now to FIG. 1 of the drawing, in accordance with one embodiment of the present invention, a hydrocarbon feedstock as previously described, which in this case may boil above 400° F. and which contains more than 50 parts per million of organic nitrogen compounds, is passed through line 1 into hydrofining-hydrocracking zone 2, which contains the catalyst of the present invention. The feedstock is hydrocracked in hydrocracking zone 2 at conditions previously described, in the presence of hydrogen supplied through line 3. Under these conditions, concurrent hydrodenitrification takes place to the extent that the feedstock is substantially denitrified. The effluent from zone 2 is passed through line 4 to separation zone 5, from which hydrogen separated from the treated feedstock is recycled through line 6 to zone 2. In zone 5, water entering through line 7 is used to scrub ammonia and other contaminants from the incoming hydrocarbon stream, and the ammonia, water and other contaminants are withdrawn from zone 5 through line 8. From zone 5, the scrubbed, hydrocracked materials are passed through line 9 to distillation column 10, where they are separated into fractions, including a $C_4$—fraction which is withdrawn through line 15, a $C_5$—180° F. fraction which is withdrawn through line 16, a 180°–400° F. fraction which is withdrawn through line 17, a 320°–550° F. fraction which is withdrawn through line 18, and a 320° F.+ fraction which is withdrawn through line 19. The $C_5$—180° F. fraction withdrawn through line 16 is a superior-quality light gasoline. The 180°–400° F. fraction withdrawn through line 17 is a superior catalytic reforming feedstock, which may be catalytically reformed in reforming zone 20, from which a superior catalytic reformate may be withdrawn through line 25. The 320°–550° F. fraction withdrawn through line 18 is a superior-quality jet fuel. The 320° F.+ fraction withdrawn through line 19 is a superior hydrocracking feedstock, which may be catalytically hydrocracked in hydrocracking zone 26 in the presence of a conventional hydrocracking catalyst and in the presence of hydrogen supplied to zone 26 through line 27. From hydrocracking zone 26, an effluent may be withdrawn through line 28, hydrogen may be separated therefrom in separator 29, and hydrogen may be recycled to hydrocracking zone 26 through line 30. Alternatively, said 320° F.+ fraction may be catalytically cracked in a catalytic cracking zone under conventional catalytic cracking conditions. From separator 29, hydrocracked materials may be passed through lines 35 and 9 to distillation column 10, where they may be separated into fractions, as previously described.

Referring now to FIG. 2, a hydrocarbon feedstock as previously described, which in this case may boil above 400° F. and which contains more than 50 parts per million of organic nitrogen compounds, is passed through line 50 to hydrofining-hydrocracking zone 51, containing the catalyst of the present invention. The feedstock is concurrently hydrofined and hydrocracked in zone 51 at conditions previously described in the presence of hydrogen supplied through line 52. The effluent from zone 51 may be passed through line 53 into hydrocracking zone 54, where it may be hydrocracked under the same conditions as used in zone 51, in the presence of a hydrocracking catalyst. The hydrocracking catalyst in zone 54 may be the same catalyst as used in zone 51, or may be a conventional hydrocracking catalyst comprising a crystalline zeolitic molecular sieve cracking component, in either of which cases the effluent from zone 51 may be passed through line 53 into zone 54 without intervening impurity removal. If the hydrocracking catalyst in zone 54 does not contain a crystalline zeolitic molecular sieve component, it is preferred that interstage removal of ammonia and other impurities be accomplished between zones 51 and 54. Zones 51 and 54 may be located in separate reactor shells, which may be operated at different pressures. Alternatively, zones 51 and 54 may be separate catalyst beds located in a single pressure shell 55, and the effluent from zone 51 may be passed to zone 54 without intervening pressure letdown, condensation or impurity removal, particularly in the case where zone 54 contains the catalyst used in the process of the present invention or a conventional catalyst comprising a crystalline zeolitic molecular sieve component. The effluent from zone 54 is passed through line 56 to separation zone 57, from which hydrogen is recycled through line 58 to hydrofining-hydrocracking zone 51. All or a portion of the recycled hydrogen may be passed through line 59 to hydrocracking zone 54, if desired. In separation zone 57, water entering through line 60 is used to scrub ammonia and other contaminants from the incoming hydrocarbon stream, if these contaminants previously have not been removed between zones 51 and 54, and the ammonia, water and other contaminants are withdrawn from zone 57 through line 65. The effluent from zone 57 is passed through line 66 to distillation column 67, where it is separated into fractions, including a $C_4$—fraction which is withdrawn through line 68, a $C_5$—180° F. fraction which is withdrawn through line 69, a 180°–400° F. fraction which is withdrawn through line 70, a 320°–550° F. fraction which is withdrawn through line 71, and a 320° F.+ fraction which is withdrawn through line 72. The fraction withdrawn through line 72 may be recycled through lines 73 and 74 to hydrofining-hydrocracking zone 51, and this is a preferred manner of operation. All or a portion of the fraction in line 73 may be recycled to hydrocracking zone 54 through line 75, if desired. The $C_5$—180° F. fraction withdrawn through line 69 is a superior-quality light gasoline. The 180°–400° F. fraction withdrawn through line 70 is a superior catalytic reforming feedstock, which may be catalytically reformed in reforming zone 76, from which a superior catalytic reformate may be withdrawn through line 77. The 320°–550° F. fraction withdrawn through line 71 is a superior-quality jet fuel. All or a portion of the 320° F.+ fraction withdrawn through line 72 may be passed through line 78 to catalytic cracking zone 79, where it may be catalytically cracked under conventional catalytic cracking conditions in the presence of a conventional catalytic cracking catalyst to produce valuable fuel products, which may be withdrawn from zone 79 through line 80.

EXAMPLES

The following examples are given for the purpose of further illustrating the process of the present invention, the catalyst used therein, and the preparation of said catalyst. The examples are not intended to limit the scope of the present invention.

EXAMPLE 1

A cogelled catalyst (Catalyst A) of the following composition is prepared:

| Component | Wt. % of Total Catalyst |
| --- | --- |
| NiO | 10.0 |
| $WO_3$ | 24.5 |
| $Al_2O_3$ | 29.0 |
| $SiO_2$ | 25.5 |
| Filtrol rare earth-exchanged faujasite | 11.0 |
| Total | 100.0 |

The catalyst is prepared in the following steps, using sufficient quantities of the various starting materials to produce the above-indicated weight percentages of the components of the final catalyst.

1. An aqueous acidic solution is prepared, containing $AlCl_3$, $NiCl_2$ and acetic acid.
2. Three alkaline solutions are prepared: (1) a sodium silicate solution; (2) a sodium tungstate solution; and (3) an ammonia solution containing sufficient excess ammonia so that upon combining the alkaline solutions with the acidic solution coprecipitation of all of the metal-containing components of the solutions would occur at a neutral pH of about 7.
3. The acidic and alkaline solutions are combined, and coprecipitation of all of the metal-containing components of the solutions occurs at a pH of about 7, resulting in a slurry.
4. Filtrol rare earth-exchanged faujasite in finely divided form is added to the slurry.
5. The molecular sieve-containing slurry is filtered to produce a molecular sieve-containing hydrogel filter cake, which is washed repeatedly with dilute ammonium acetate solution, to remove sodium and chloride ionic impurities from both the hydrogel and the molecular sieve contained therein.
6. The molecular sieve-containing hydrogel is dried in an air-circulating oven and then is activated in flowing air for 5 hours at 950° F.

The finished catalyst is characterized by a surface area of about 400 M²/g., a pore volume of about 0.4 cc./g., and an average pore diameter of about 40 angstroms, and a rare earth-loaded molecular sieve component substantially free of catalytic metals; that is, substantially all of the nickel and tungsten contained in the catalyst is located in the gel portion of the catalyst rather than in the molecular sieve component thereof.

EXAMPLE 2

A cogelled catalyst (Catalyst B) is prepared exactly as in Example 1, except that no molecular sieve component is incorporated therein. The amounts of starting materials are selected to provide a final catalyst with the same proportions of non-molecular sieve components as the catalyst of Example 1. The composition of the final catalyst is:

| Component | Wt.% of Total Catalyst |
| --- | --- |
| NiO | 11.2 |
| $WO_3$ | 27.5 |
| $Al_2O_3$ | 32.6 |
| $SiO_2$ | 28.7 |
| Total | 100.0 |

It will be noted that the weight percentage of each non-molecular sieve component of Catalyst A is 89 percent of the weight percentage of the same component of Catalyst B, the additional 11 weight percent of Catalyst A being contributed by the molecular sieve component.

EXAMPLE 3

Portions of Catalysts A and B of Examples 1 and 2, respectively, are separately used to hydrodenitrify separate portions of a California cycle oil feedstock, on a once-through basis.

The cycle oil feedstock has the following characteristics:

| | |
| --- | --- |
| Aniline point, °F. | 136 |
| Boiling range, °F. | 400–800 |
| Gravity, °API | 19.6 |
| Organic nitrogen content, ppm | 2700 |
| Organic sulfur content, weight % | 0.95 |

The hydrodenitrification conditions are:

| | |
| --- | --- |
| Total pressure, psig | 1660 |
| Total hydrogen rate, SCF/bbl. | 9000 |
| Liquid hourly space velocity, V/V/hr. | 1.5 |
| Starting temperature, °F., necessary to achieve a product organic nitrogen content of 0.4 ppm | as indicated below |

The hydrodenitrification activities of the two catalysts, as measured by the starting temperatures necessary to achieve the indicated product nitrogen level of 0.4 ppm, are:

| Catalyst | Starting T, °F. |
| --- | --- |
| A | 748 |
| B | 770 |

From the foregoing, it may be seen that the addition of a rare-earth loaded molecular sieve to Catalyst B results in Catalyst A, and that Catalyst A has hydrodenitrification efficacy markedly superior to that of Catalyst B.

CONCLUSIONS

Applicants do not intend to be bound by any theory for the unexpectedly superior hydrofining and hydrocracking activity of the catalyst used in the process of the present invention. Applicants assume that the favorable results are largely attributable to, and unique to, the particular combination of catalytic components used, coupled with a relatively high ratio of catalytic metals in the non-molecular sieve portion of the catalyst compared with the catalytic metals in the molecular sieve portion of the catalyst, and further coupled with the low absolute amount of catalytic metals in the molecular sieve portion of the catalyst.

What is claimed is:

1. A hydrofining-hydrocracking process which comprises contacting a hydrocarbon feed containing more than 50 parts per million of organic nitrogen and substantial amounts of materials boiling above 200° F., said feed being selected from the group consisting of petroleum distillates, solvent-deasphalted petroleum residua, shale oils and coal tar distillates, in a reaction zone with hydrogen and a catalyst, at hydrofining-hydrocracking conditions including a temperature in the range 400° to 950° F., a pressure in the range 800 to 3,500 psig, a liquid hourly space velocity in the range 0.1 to 5.0, and a total hydrogen supply rate of 200 to 20,000 SCF of hydrogen per barrel of feedstock, removing ammonia from the effluent from said reaction zone, and recovering hydrofined and hydrocracked products from said reaction zone, said catalyst comprising:

A. A gel matrix comprising:
  a. at least 15 weight percent silica,
  b. alumina, in an amount providing an alumina-to-silica weight ratio of 15/85 85 to 80/20,
  c. Nickel or cobalt, or the combination thereof, in the form of metal, oxide, sulfide or any combination thereof, in an amount of 1 to 10 weight percent, based on said matrix, calculated as metal,
  d. Molybdenum or tungsten, or the combination thereof, in the form of metal, oxide, sulfide or any combination thereof, in an amount of 5 to 25 weight percent, based on said matrix, calculated as metal;
B. A crystalline zeolitic molecular sieve:
  a. containing less than 5 weight percent sodium,
  b. containing ions selected from Mn, rare earths of atomic numbers 58 to 71, and alkaline earths Mg, Ca, Sr and Ba,
  c. being substantially free of Group VI and Group VIII catalytic loading metals,
  d. being in particulate form and being dispersed throughout said matrix by cogelation of said matrix around said sieve;
    said catalyst composite being further characterized by an average pore diameter below 100 Angstroms and a surface area above 200 square meters per gram.

2. A process as in claim 1, wherein a gasoline product and a jet fuel product are recovered from the effluent from said reaction zone.

3. A process as in claim 2, wherein a portion of the effluent from said reaction zone boiling above the gasoline boiling range is hydrocracked in a second reaction zone in the presence of hydrogen and a hydrocracking catalyst at hydrocracking conditions including a temperature in the range 400° to 950° F., a pressure in the range 800 to 3,500 psig, a liquid hourly space velocity in the range 0.1 to 5.0, and a total hydrogen supply rate of 200 to 20,000 SCF of hydrogen per barrel of feedstock, and wherein at least one hydrocracked product is recovered from said reaction zone.

* * * * *